US007843832B2

(12) United States Patent
Choi et al.

(10) Patent No.: US 7,843,832 B2
(45) Date of Patent: Nov. 30, 2010

(54) DYNAMIC BANDWIDTH ALLOCATION APPARATUS AND METHOD

(75) Inventors: Sung-gu Choi, Daejeon (KR); Ji-Soo Park, Daejeon (KR); Soon-Gi Park, Daejeon (KR); Jae-Su Song, Daejeon (KR); Sang-Woo Nam, Daejeon (KR); Yeon-Seung Shin, Daejeon (KR); Yeong-Jin Kim, Daejeon (KR)

(73) Assignees: Electronics and Telecommunications Research Institute, Daejeon (KR); SK Telecom Co., Ltd., Seoul (KR); KT Corporation, Kyeonggi-do, Seongnam (KR)

( * ) Notice: Subject to any disclaimer, the term of this patent is extended or adjusted under 35 U.S.C. 154(b) by 945 days.

(21) Appl. No.: 11/528,552

(22) Filed: Sep. 28, 2006

(65) Prior Publication Data

US 2007/0133407 A1    Jun. 14, 2007

(30) Foreign Application Priority Data

Dec. 8, 2005    (KR)    ........................ 10-2005-0119982
May 9, 2006    (KR)    ........................ 10-2006-0041347

(51) Int. Cl.
*G01R 31/08*    (2006.01)
(52) U.S. Cl. .................................. 370/235.1; 370/431
(58) Field of Classification Search ........................ None
See application file for complete search history.

(56) References Cited

U.S. PATENT DOCUMENTS

| 5,596,576 | A | 1/1997 | Milito |
| 6,522,628 | B1 | 2/2003 | Patel et al. |
| 6,542,481 | B2 | 4/2003 | Foore et al. |
| 6,801,500 | B1 * | 10/2004 | Chandran ................ 370/230.1 |
| 7,126,913 | B1 * | 10/2006 | Patel et al. ................ 370/230.1 |

(Continued)

FOREIGN PATENT DOCUMENTS

KR    1019990041062    6/1999

(Continued)

OTHER PUBLICATIONS

Office Action dated Dec. 1, 2008, for European application No. 06121462.3

(Continued)

*Primary Examiner*—Phuc Tran
(74) *Attorney, Agent, or Firm*—Lowe Hauptman Ham & Berner LLP

(57) ABSTRACT

In a bandwidth allocation method and/or apparatus for adaptively allocating radio channels in a mobile communication system, a token bucket is periodically filled with an amount of tokens that corresponds to a requested amount of bandwidth, and a bandwidth is allocated in accordance with the amount of tokens in the token bucket. In a further bandwidth allocation method and/or apparatus for adaptively allocating radio channels in a mobile communication system, a packet classification module classifies received packets on the basis of one of an Internet Protocol address, a port, and an upper layer protocol, a packet scheduler module receives the classified packet from a buffer module for transmission to a mobile station, and a bandwidth allocation module forms the buffer module for bandwidth allocation and processes traffic services by inter-working with the packet scheduler module when the bandwidth allocation is requested.

16 Claims, 3 Drawing Sheets

U.S. PATENT DOCUMENTS

2002/0174944 A1* 11/2002 DeFrank et al. ............. 156/257
2006/0140128 A1* 6/2006 Chi et al. .................... 370/241

FOREIGN PATENT DOCUMENTS

| KR | 1020010054737 | 7/2001 |
| KR | 1020030050309 | 6/2003 |
| KR | 1020040056480 | 7/2004 |
| KR | 1020060032741 | 4/2006 |
| KR | 1020060064474 | 6/2006 |
| WO | 03/085903 | 10/2003 |

OTHER PUBLICATIONS

European Search Report for EP06121462.

Andreadis et al.; "High-capacity resource sharing schemes for broadband wireless networks"; Wireless Communications and Mobile Computing; 2004; pp. 395-412.

Fotini-Niovi Pavlidou; "Mixed Media Cellular Systems"; IEEE Transactions on Communications; Feb./Mar./Apr. 1994; pp. 848-853.

Patent document for corresponding European Patent App. 06121462.3, Jan. 12, 2008.

* cited by examiner

DYNAMIC BANDWIDTH ALLOCATION APPARATUS AND METHOD

CROSS-REFERENCE TO RELATED APPLICATION

This application claims priority to and the benefit of Korean Patent Application Nos. 10-2005-0119982 and 10-2006-0041347 respectively filed in the Korean Intellectual Property Office on Dec. 8, 2005 and May 9, 2006, the entire contents of which are incorporated herein by reference.

BACKGROUND OF THE INVENTION (a) Field of the Invention

The present invention relates to a bandwidth allocation apparatus and a method thereof. More particularly, the present invention relates to an apparatus for adaptively allocating radio channels in a mobile communication system, and a method thereof.

(b) Description of the Related Art

The next generation mobile communication system will mainly handle multimedia traffic services having various features.

Thus, the next generation mobile communication system controls a bandwidth for efficient processing of multimedia traffic while satisfying communication quality of service (QoS).

A significant increase of usable resources for each cell is expected in the next generation mobile communication system compared to the present mobile communication system. For example, each cell is allocated with up to 2 Mbps of bandwidth in the WCDMA system but it will be allocated with up to 100 Mbps of bandwidth in the next-generation mobile communication system. Therefore, a bandwidth allocation determination scheme will be an important factor for an efficient use of radio resources and multimedia traffic processing in the next generation communication system.

The bandwidth allocation determination scheme will be more complex in the future since various types of traffic will be generated as user traffic is changed from small-capacity voice and data communication to large-capacity multimedia communication.

Particularly, video traffic is a main concern in the multimedia traffic, and various studies have been conducted to develop an efficient bandwidth allocation scheme thereof.

One of the most well-known bandwidth allocation schemes is an effective bandwidth scheme. The effective bandwidth scheme produces a value between an average bandwidth and the maximum bandwidth, and the value satisfies a communication quality of service (QoS) traffic requirement (e.g., packet loss rate and delay).

The concept of the effective bandwidth scheme is quite attractive, but it is difficult to apply to a substantial communication system. Also, it is difficult to determine an effective bandwidth for video traffic in advance.

Conventionally, communication QoS for voice traffic has been controlled by providing a predetermined communication QoS or controlled by determining priority of services depending on a condition (e.g., a bottleneck) of a system.

However, multimedia traffic services having various features have distinctive service characteristics, and accordingly they cannot be indiscriminately controlled by the conventional communication QoS scheme.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a bandwidth allocation apparatus for periodically filling a token bucket with an amount of tokens that corresponds to the amount of bandwidth determined to be allocated for each traffic flow by the call admission control module and adaptively allocating bandwidths, and a method thereof.

An exemplary bandwidth allocation method according to an embodiment of the present invention adaptively allocates radio channels in a mobile communication system. The bandwidth allocation method includes: (a) allocating a bandwidth to process traffic services and compare a current queue length and a minimum queue length, the current queue length being measured for a unit of time; (b) when the current queue length is less than the minimum queue length, comparing a packet loss rate and a packet loss threshold value to determine which one is greater than the other one, wherein the packet loss rate determines an amount of bandwidth to be allocated for the next time interval; and (c) when the packet loss rate is less than the packet loss threshold value, reducing the current bandwidth by a large amount.

An exemplary bandwidth allocation apparatus according to an embodiment of the present invention adaptively allocates radio channels in a mobile communication system. The bandwidth allocation apparatus includes a call admission control module, a packet classification module, a buffer module, a packet scheduler module, and a bandwidth allocation module. The call admission control module requests bandwidth allocation in the case that a call signal of a mobile station is accepted. The packet classification module classifies received packets on the basis of one of an Internet Protocol address, a port, and an upper layer protocol in use, and transmits classified packets. The buffer module receives and stores the classified packets transmitted from the packet classification module. The packet scheduler module receives the classified packet from the buffer module and transmits the packets to the mobile station through a radio resource link. The bandwidth allocation module forms the buffer module for bandwidth allocation and processes traffic services by inter-working with the packet scheduler module in the case that the bandwidth allocation is requested by the call admission control module.

DETAILED DESCRIPTION OF THE EMBODIMENTS

Figure 1:
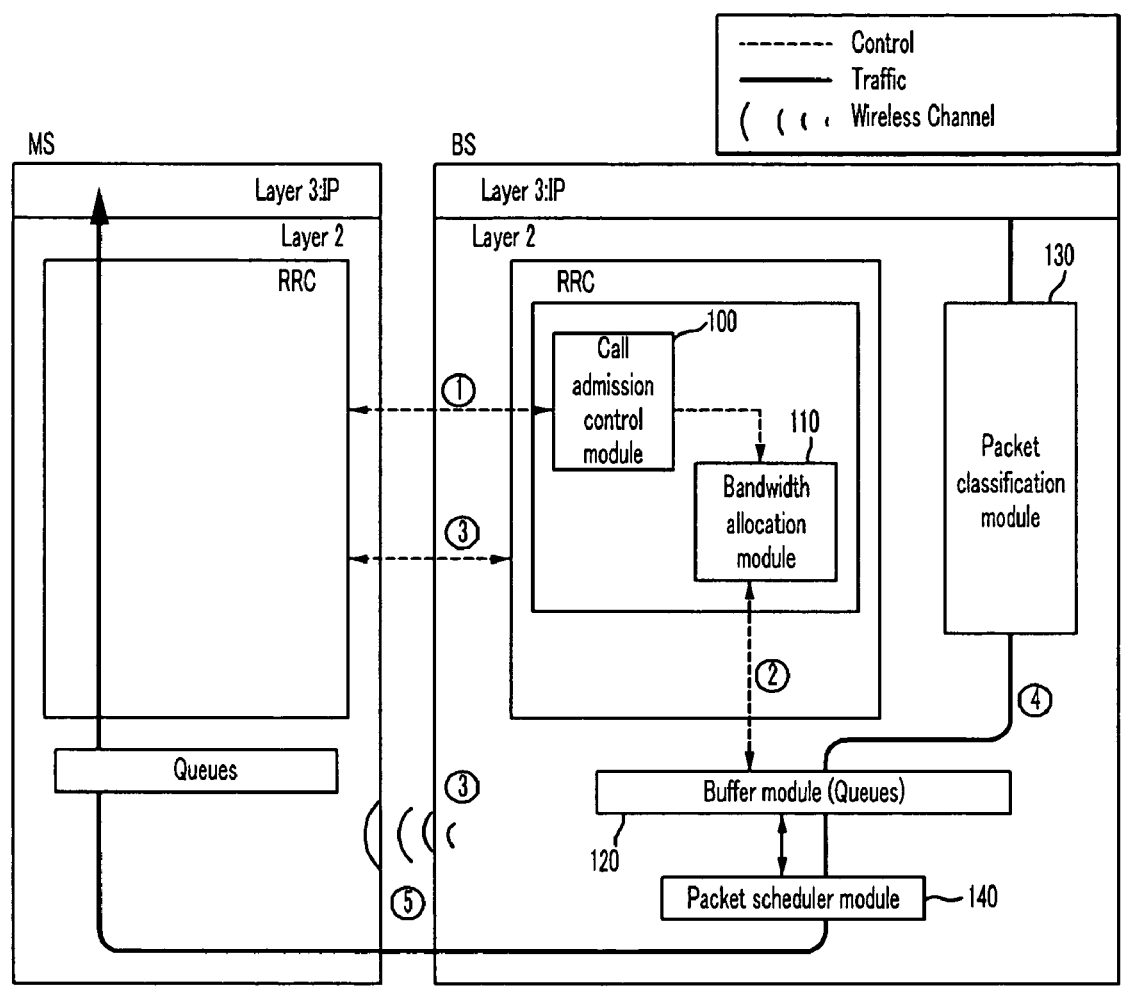
FIG. 1 is a block diagram showing a mobile station and a base station of a mobile communication system, and main functionalities of sub-systems of the base station according to an embodiment of the present invention.

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. The drawings and description are to be regarded as illustrative in nature and not restrictive, and like reference numerals designate like elements throughout the specification.

Throughout this specification and the claims which follow, unless explicitly described to the contrary, the word "comprise" or variations such as "comprises" or "comprising" will be understood to imply the inclusion of stated elements but not the exclusion of any other elements.

In addition, throughout this specification and the claims which follow, a module means a unit that performs a specific function or operation, and can be realized by hardware of software, or a combination of both.

A bandwidth allocation apparatus for adaptively allocating radio channels and a method thereof in a mobile communication system according to an embodiment of the present invention will now be described.

FIG. 1 is a block diagram showing a base station and a mobile station of a mobile communication system according to an exemplary embodiment of the present invention, and schematically illustrates main functionalities of each subsystem of the base station.

Downlink bandwidth allocation between the base station and the mobile station according to the exemplary embodiment of the present invention will now be described.

Particularly, a radio resource control (RRC) connection is established between the mobile station and the base station to control resource allocation modification.

Protocol layers may be divided into Layer 1 (i.e., a physical layer), Layer 2 (i.e., a data link layer), and Layer 3 (i.e., a radio resource control layer) according to three lower layers of the open system interconnection (OSI) reference model for worldwide communication systems.

The radio resource control layer located at the bottom of the Layer 3 is defined only for a control plane, and establishes/re-establishes/releases a radio bearer to control transmission and physical channels.

When a user turns on the mobile station, the mobile station searches for the most appropriate cell and remains idle in the searched cell.

The mobile station in the idle mode is shifted to a radio resource control (RRC)-connected state by establishing an RRC connection with the base station. That is, the mobile station in the idle mode must perform a RRC connection establishment process in order to have a RRC connection with the base station.

The base station according to the exemplary embodiment of the present invention includes a call admission control module 100, a bandwidth allocation module 110, a buffer module (i.e., queue) 120, a packet classification module 130, and a packet scheduler module 140.

The mobile station transmits an RRC connection request message to the base station, the base station transmits an RRC connection establishment message to the mobile station in response to the RRC connection request message, and then the mobile station transmits an RRC connection establishment complete message to the base station such that the RRC connection is established between the mobile station and the base station.

The RRC of the base station determines whether to accept a call signal or not by operating the call admission control module 100.

When the call signal is determined to be accepted, the call admission control module 100 generates a bandwidth allocation request signal for the mobile station and transmits the bandwidth allocation request signal to the bandwidth allocation module 110.

Upon arrival of the bandwidth allocation request signal from the call admission control module 100, the bandwidth allocation module 110 forms a buffer module 120 for bandwidth allocation.

The buffer module 120 receives and stores packets that are determined by the packet classification module 130, and transmits packets to the packet scheduler module 140 in proportion to the amount of tokens in the token bucket.

The packet classification module 130 classifies downlink packets on the basis of an Internet Protocol (IP) address, a port, and a usable upper layer protocol, and transmits the classified packets to the corresponding queues 120, accordingly.

The packet scheduler module 140 receives the determined packets from the buffer module 120 and transmits the packets to the mobile station through a wireless radio link.

Figure 2:
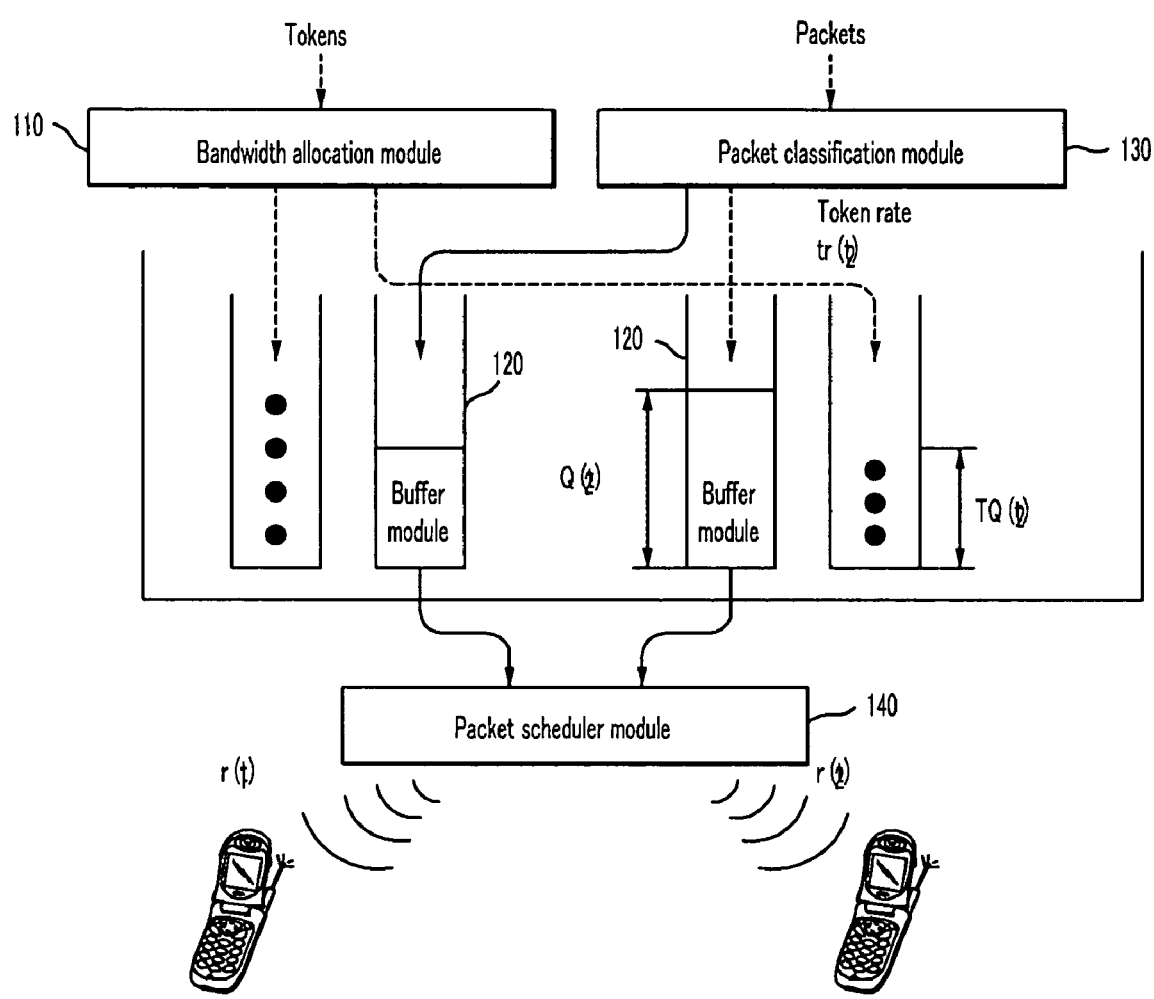
FIG. 2 is a diagram showing a structure of an effective bandwidth allocation according to an exemplary embodiment of the present invention.

FIG. 2 is a diagram showing a structure of an effective bandwidth allocation according to an exemplary embodiment of the present invention.

The bandwidth allocation module 110 of the base station allocates the corresponding token bucket and the corresponding queue 120 to each cell for respective user video traffic flows.

The bandwidth allocation module 110 periodically fills each token bucket with an amount of tokens that corresponds to an initially allocated bandwidth by the call admission module 100. The bandwidth allocation module 110 controls the amount of tokens filled in the token so as to control a bandwidth allocated for each video traffic flow.

The bandwidth allocation module 110 provides many tokens for heavy traffic for accurate transmission of information, and provides few tokens for light traffic in order to provide the rest of the tokens for other traffic services. The bandwidth allocation module 110 determines bandwidth allocation for each traffic flow by employing a token bucket algorithm, and sets a sum of allocated bandwidths to not exceed a maximum supportable resource bandwidth for the cell.

The bandwidth allocation module 110 may guarantee a minimum throughput for each video traffic flow by using the token bucket algorithm. The bandwidth allocation module 110 allocates a bandwidth for each video traffic flow for each predetermined time interval.

The bandwidth allocation module 110 according to the exemplary embodiment of the present invention allocates a minimum bandwidth that satisfies demanded quality of communication service, and maximizes utility of the allocated bandwidth.

In the case that the utility of the bandwidth is relatively low, the bandwidth allocation module 110 reduces bandwidth allocation. Otherwise, the bandwidth allocation module 110 increases bandwidth allocation. The bandwidth allocation module 110 reduces/increases the bandwidth allocation in accordance with measured communication QoS.

In the case that the probability of communication QoS requirement violation is relatively high, the bandwidth allocation module 110 increases a bandwidth increase rate and decreases a bandwidth decrease rate. In the case that the probability of communication QoS requirement violation is relatively low, the bandwidth allocation module 110 increases the bandwidth decrease rate and increases the bandwidth decrease rate. Herein, the utility value of a current bandwidth is an important factor to determine whether to increase or decrease bandwidth allocation for the next time interval. In addition, satisfaction on the present communication QoS affects the bandwidth change rate. The above-stated process is repeated every time unit.

Figure 3:
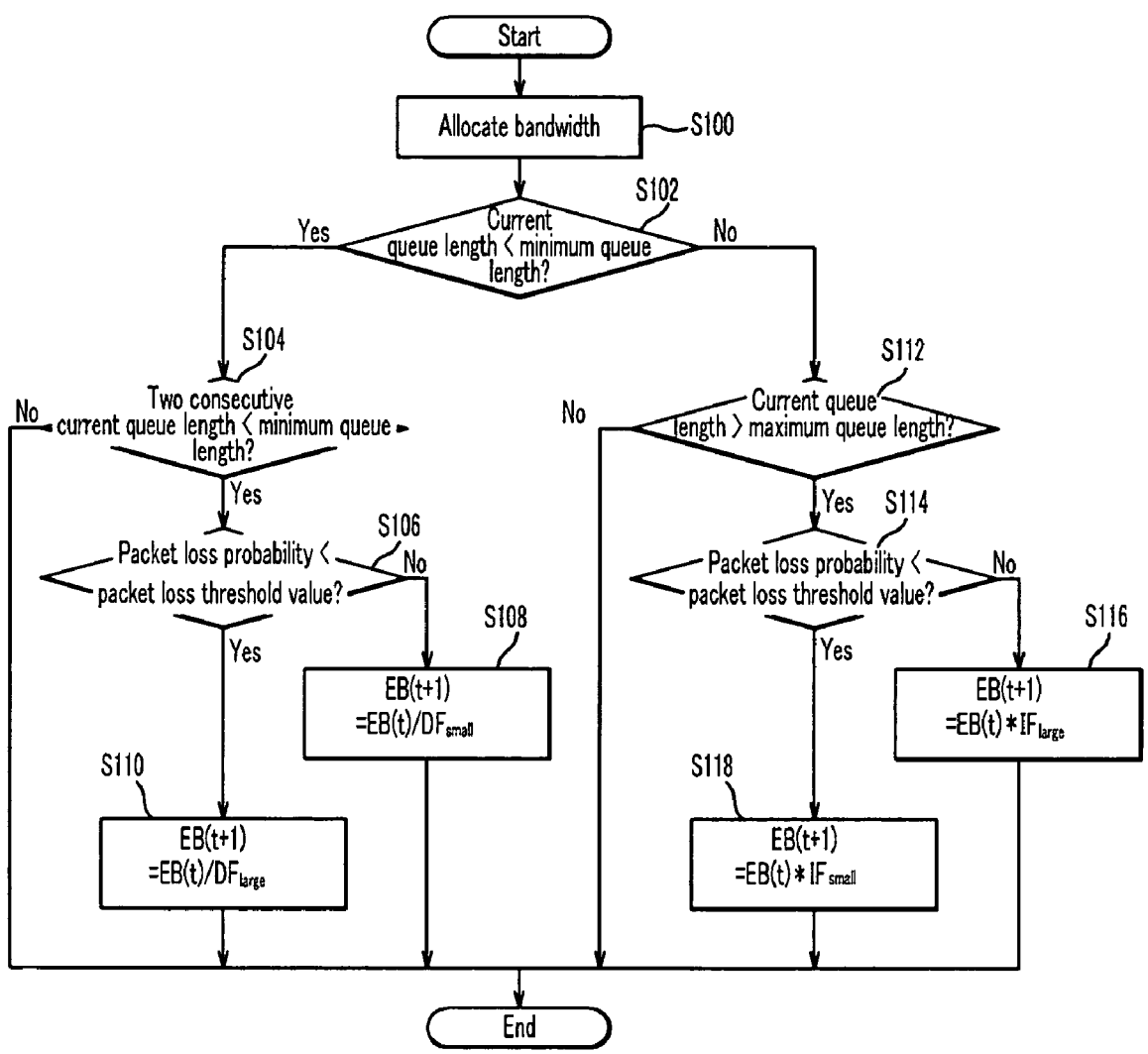
FIG. 3 is a flowchart showing a method for allocating bandwidth by using a bandwidth allocation module according to an exemplary embodiment of the present invention.

FIG. 3 is a flowchart showing a method for maximizing use of system resources while satisfying communication QoS of video traffic of each user. The method uses an adaptive bandwidth allocation algorithm that employs a token bucket.

Herein, the word "adaptive" implies that bandwidth allocation is determined in real-time and is dynamically and continuously changed in accordance with circumstances.

In addition, a packet loss rate is used to level communication QoS, and a video traffic flow for each user has a maximum allowable packet loss rate.

Hereinafter, a bandwidth allocation algorithm performed by the bandwidth allocation module 110 will be described with reference to FIG. 3.

FIG. 3 is a flowchart showing a method for allocating a bandwidth by using the bandwidth allocation module 110 according to the exemplary embodiment of the present invention.

The bandwidth allocation module 110 according to the exemplary embodiment of the present invention allocates a bandwidth at every time unit for each traffic flow, and allocates a minimum bandwidth that satisfies communication QoS requirement while maximizing utility of the bandwidth.

In the present embodiment, a queue length and a packet loss rate are used as matrixes for determining bandwidth utility and communication QoS requirement.

The bandwidth allocation module 110 compares a queue length QL(t) to a minimum queue length $QL_{low}$ and a maximum queue $QL_{high}$ to determine whether an excessive amount of bandwidth is allocated or an insufficient amount of bandwidth is allocated.

Herein, the queue length QL(t) represents a queue length measured for a unit of time t.

In the case that the queue length QL(t) is less than the minimum queue length $QL_{low}$, the bandwidth allocation module 110 regards the corresponding signal to waste the bandwidth, and reduces an allocated bandwidth.

In the case that the queue length QL(t) is greater than $QL_{high}$, the bandwidth allocation module 110 regards the corresponding signal to over-utilize the bandwidth, and increases the allocated bandwidth.

In the case that the queue length QL(t) has a middle value of the minimum queue length $Q_{low}$ and the maximum queue $QL_{high}$, the bandwidth allocation module 110 does not change the allocated bandwidth.

The bandwidth allocation module 110 allocates a bandwidth at every unit of time for each traffic flow in step S100, and determines whether a current queue length is less than the minimum queue length in step S102.

When the current queue length is less than the minimum queue length, the bandwidth allocation module 110 determines whether the current queue length is less than the minimum queue length during two consecutive time intervals in step S104.

In the case that the current queue length is less than the minimum queue length during the two consecutive time units, the bandwidth allocation module 110 measures a packet loss rate (i.e., packet loss rate due to transmission error in the network) by sampling a packet loss through a ping.

The packet loss rate is used as a parameter for determination of an amount of bandwidth to be allocated to the next time interval.

Subsequently, the bandwidth allocation module 110 determines whether the packet loss rate is less than a packet loss threshold value $PL_{threshold}$ in step S106.

When the packet loss rate is less than the packet loss threshold value, the bandwidth allocation module 110 reduces the current bandwidth by a relatively small amount in order to avoid packet loss in the next unit of time in step S108.

In the case that the packet loss rate is less than the packet threshold value, the bandwidth allocation module 110 reduces the current bandwidth by a relatively large amount in order to avoid packet loss in the next unit of time, in step S110.

When the current queue length is greater than the minimum queue length, the bandwidth allocation module 110 determines whether the current queue length is greater than the maximum queue length in step S112.

In the case that the current queue length is greater than the maximum queue length, the bandwidth allocation module 110 determines whether the packet loss rate is less than the packet loss threshold value $PL_{threshold}$ in step S114.

When the packet loss rate is greater than the packet loss threshold value, the packet bandwidth allocation module 110 increases the current bandwidth by a relatively large amount since the bandwidth in the time interval may allow packet loss, in step S116.

When the packet loss rate is not less than the packet loss threshold value, the bandwidth allocation module 110 reduces the current bandwidth by a relatively small amount in order to avoid packet loss in the next unit of time in step S 108.

The bandwidth allocation module 110 calculates a bandwidth to be allocated by using Equation 1.

$$EB(t+1) = \begin{cases} EB(t)/DF, & \text{for bandwidth decrease} \\ EB(t) \times IF, & \text{for bandwidth Increase} \end{cases} \quad \text{[Equation 1]}$$

where EB(t) denotes the current bandwidth, DecreaseFactor (DF) and IncreaseFactor (IF) denote re-allocation parameters, EB(t+1) denotes a bandwidth to be allocated for the next unit of time, $DF_{small}$ denotes a small amount of reduction in bandwidth re-allocation, $DF_{large}$ denotes a large amount of reduction in bandwidth re-allocation, $IF_{small}$ denotes a small amount of increase in bandwidth re-allocation, and $IF_{large}$ denotes a large amount of increase in bandwidth re-allocation.

The above-described exemplary embodiments of the present invention can be realized not only through a method and an apparatus, but also through a program that can perform functions corresponding to configurations of the exemplary embodiments of the present invention or a recording medium storing the program, and this can be easily realized by a person skilled in the art.

According to the above-stated configuration, the exemplary embodiment of the present invention provides a method for adaptive bandwidth allocation and control to thereby guarantee system performance and user's demanded communication QoS requirements.

In addition, the maximum system resource use rate is guaranteed while satisfying communication QoS of video traffic for each user according to the exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A bandwidth allocation method of adaptively allocating radio channels in a mobile communication system, the bandwidth allocation method being performed by a bandwidth allocation module of a bandwidth allocation apparatus and comprising:

receiving, from a call admission control module of the bandwidth allocation apparatus that has determined to accept a call signal of a mobile station, a bandwidth allocation request for a traffic flow for the mobile station;

associating the traffic flow with a token bucket and a queue, and periodically filling the token bucket with an amount of tokens that corresponds to a requested amount of bandwidth determined by the call admission control module; and allocating bandwidth to the traffic flow by controlling the amount of tokens in the token bucket;

wherein said allocating comprises comparing a current queue length and a minimum queue length, the current queue length being measured for a predetermined time interval; and increasing or decreasing the bandwidth depending on whether the current queue length is greater or less than the minimum queue length.

2. The bandwidth allocation method of claim 1, wherein said allocating further comprises:

comparing a packet loss rate and a packet loss threshold value, wherein the packet loss rate determines an amount of bandwidth to be allocated for the next time interval; and adjusting the current bandwidth by different amounts depending on whether the packet loss rate is greater or less than the packet loss threshold value.

3. The bandwidth allocation method of claim 2, wherein, when the current queue length is less than the minimum queue length, said adjusting comprises:

reducing the current bandwidth by a smaller amount when the packet loss rate is greater than the packet loss threshold value; and reducing the current bandwidth by a larger amount when the packet loss rate is less than the packet loss threshold value.

4. The bandwidth allocation method of claim 3, wherein, when the current queue length is greater than the minimum queue length, said adjusting comprises:

increasing the current bandwidth by a smaller amount when the packet loss rate is less than the packet loss threshold value; and increasing the current bandwidth by a larger amount when the packet loss rate is greater than the packet loss threshold value.

5. The bandwidth allocation method of claim 2, wherein, when the current queue length is greater than the minimum queue length, said adjusting comprises:

increasing the current bandwidth by a smaller amount when the packet loss rate is less than the packet loss threshold value; and increasing the current bandwidth by a larger amount when the packet loss rate is greater than the packet loss threshold value.

6. The bandwidth allocation method of claim 1, wherein said allocating further comprises when the current queue length is less than the minimum queue length, determining whether or not the current queue length is less than the minimum queue length during two consecutive time intervals; and when the current queue length is greater than the minimum queue length, determining whether or not the current queue length is greater than a maximum queue length.

7. The bandwidth allocation method of claim 6, wherein said allocating further comprises, when the current queue length is determined to be less than the minimum queue length during two consecutive time intervals, comparing a packet loss rate and a packet loss threshold value, wherein the packet loss rate determines an amount of bandwidth to be allocated for the next time interval; and adjusting the current bandwidth by different amounts depending on whether the packet loss rate is greater or less than the packet loss threshold value.

8. The bandwidth allocation method of claim 7, wherein said adjusting comprises:

reducing the current bandwidth by a smaller amount when the packet loss rate is greater than the packet loss threshold value; and reducing the current bandwidth by a larger amount when the packet loss rate is less than the packet loss threshold value.

9. The bandwidth allocation method of claim 6, wherein said allocating further comprises, when the current queue length is determined to be greater than the maximum queue length, comparing a packet loss rate and a packet loss threshold value, wherein the packet loss rate determines an amount of bandwidth to be allocated for the next time interval; and adjusting the current bandwidth by different amounts depending on whether the packet loss rate is greater or less than the packet loss threshold value.

10. The bandwidth allocation method of claim 9, wherein said adjusting comprises:

increasing the current bandwidth by a smaller amount when the packet loss rate is less than the packet loss threshold value; and increasing the current bandwidth by a larger amount when the packet loss rate is greater than the packet loss threshold value.

11. A bandwidth allocation apparatus for adaptively allocating radio channels in a mobile communication system, the bandwidth allocation apparatus comprising:

a call admission control module for requesting bandwidth allocation when a call signal of a mobile station is accepted;

a packet classification module for classifying received packets on the basis of one of an Internet Protocol address, a port, and an upper layer protocol in use, and transmitting the classified packets;

a buffer module for receiving and storing the classified packets transmitted from the packet classification module;

a packet scheduler module for receiving the classified packet from the buffer module and transmitting the packets to the mobile station through a radio resource link; and a bandwidth allocation module for forming the buffer module for bandwidth allocation, and processing traffic services by inter-working with the packet scheduler module when the bandwidth allocation is requested by the call admission control module;

wherein the bandwidth allocation module allocates a token bucket for each traffic flow and controls a bandwidth allocated to each traffic flow by controlling the amount of tokens provided in the token bucket.

12. A bandwidth allocation apparatus for adaptively allocating radio channels in a mobile communication system, the bandwidth allocation apparatus comprising:
- a call admission control module for requesting bandwidth allocation when a call signal of a mobile station is accepted;
- a packet classification module for classifying received packets on the basis of one of an Internet Protocol address, a port, and an upper layer protocol in use, and transmitting the classified packets;
- a buffer module for receiving and storing the classified packets transmitted from the packet classification module;
- a packet scheduler module for receiving the classified packet from the buffer module and transmitting the packets to the mobile station through a radio resource link; and
- a bandwidth allocation module for forming the buffer module for bandwidth allocation, and processing traffic services by inter-working with the packet scheduler module when the bandwidth allocation is requested by the call admission control module;
- wherein the bandwidth allocation module increases or decreases bandwidth allocation in accordance with the bandwidth utility.

13. A bandwidth allocation apparatus for adaptively allocating radio channels in a mobile communication system, the bandwidth allocation apparatus comprising:
- a call admission control module for requesting bandwidth allocation when a call signal of a mobile station is accepted;
- a packet classification module for classifying received packets on the basis of one of an Internet Protocol address, a port, and an upper layer protocol in use, and transmitting the classified packets;
- a buffer module for receiving and storing the classified packets transmitted from the packet classification module;
- a packet scheduler module for receiving the classified packet from the buffer module and transmitting the packets to the mobile station through a radio resource link; and
- a bandwidth allocation module for forming the buffer module for bandwidth allocation, and processing traffic services by inter-working with the packet scheduler module when the bandwidth allocation is requested by the call admission control module;
- wherein the bandwidth allocation module controls increase/decrease of the bandwidth allocation depending on a measured communication quality of service (QoS).

14. The bandwidth allocation apparatus of claim 13, wherein
- when the communication QoS violation probability is high, the bandwidth allocation module increases a bandwidth increase rate and reduces a bandwidth decrease rate, and
- when the communication QoS violation rate is low, the bandwidth allocation module reduces the bandwidth increase rate and increases the bandwidth decrease rate.

15. A bandwidth allocation apparatus for adaptively allocating radio channels in a mobile communication system, the bandwidth allocation apparatus comprising:
- a call admission control module for requesting bandwidth allocation when a call signal of a mobile station is accepted;
- a packet classification module for classifying received packets on the basis of one of an Internet Protocol address, a port, and an upper layer protocol in use, and transmitting the classified packets;
- a buffer module for receiving and storing the classified packets transmitted from the packet classification module;
- a packet scheduler module for receiving the classified packet from the buffer module and transmitting the packets to the mobile station through a radio resource link; and
- a bandwidth allocation module for forming the buffer module for bandwidth allocation, and processing traffic services by inter-working with the packet scheduler module when the bandwidth allocation is requested by the call admission control module;
- wherein the bandwidth allocation module periodically fills each token bucket with an amount of tokens that corresponds to an amount of bandwidth determined by the call admission control module.

16. A bandwidth allocation method of adaptively allocating radio channels in a mobile communication system, the bandwidth allocation method being performed by a bandwidth allocation apparatus and comprising the following steps in which:
- a call admission control module of the bandwidth allocation apparatus requests bandwidth allocation when a call signal of a mobile station is accepted;
- a packet classification module of the bandwidth allocation apparatus classifies received packets on the basis of one of an Internet Protocol address, a port, and an upper layer protocol in use, and transmits the classified packets;
- a buffer module of the bandwidth allocation apparatus receives and stores the classified packets transmitted from the packet classification module;
- a packet scheduler module of the bandwidth allocation apparatus receives the classified packet from the buffer module and transmits the packets to the mobile station through a radio resource link; and
- a bandwidth allocation module of the bandwidth allocation apparatus
    - forms the buffer module for bandwidth allocation,
    - processes traffic services by inter-working with the packet scheduler module when the bandwidth allocation is requested by the call admission control module, and
    - controls increase/decrease of the bandwidth allocation depending on a measured communication quality of service (QoS).

* * * * *